United States Patent [19]

Leidecker et al.

[11] Patent Number: 5,067,594

[45] Date of Patent: Nov. 26, 1991

[54] RESILIENT GUIDE FOR THE BRAKE HOUSING OF A FLOATING CALIPER SPOT-TYPE DISC BRAKE

[75] Inventors: Hans-Dieter Leidecker, Frankfurt am Main; Bodo Schmidt, Lauterbach; Helmut Krause, Kelkheim; Karl-Heinz Dobener, Eschenburg, all of Fed. Rep. of Germany

[73] Assignee: Alfred Teves GmbH, Frankfurt am Main, Fed. Rep. of Germany

[21] Appl. No.: 495,249

[22] Filed: Mar. 16, 1990

[30] Foreign Application Priority Data

Mar. 17, 1989 [DE] Fed. Rep. of Germany ....... 3908741

[51] Int. Cl.$^5$ ............................................. F16D 65/02
[52] U.S. Cl. .............................. 188/73.35; 188/73.39; 188/73.43; 188/205 A
[58] Field of Search ............... 188/73.35, 73.36, 73.37, 188/73.38, 205 A, 206 A, 205 R, 206 R, 73.31, 73.34, 73.33, 73.39, 73.43, 73.42, 73.41

[56] References Cited

U.S. PATENT DOCUMENTS

| | | | |
|---|---|---|---|
| 3,485,325 | 12/1969 | Miler | 188/205 A X |
| 3,710,896 | 1/1973 | Machek . | |
| 3,880,261 | 4/1975 | Courbot | 188/73.38 |
| 4,056,174 | 11/1977 | Wienand et al. | 188/73.36 |
| 4,061,209 | 12/1977 | Gee et al. | 188/73.36 |
| 4,072,215 | 2/1978 | Burgdorf et al. | 188/72.4 |
| 4,134,477 | 1/1979 | Asquith | 188/73.36 X |
| 4,136,961 | 1/1979 | Burgdorf et al. | 188/73.36 X |
| 4,276,965 | 7/1981 | Pickel | 188/73.35 |
| 4,858,728 | 8/1989 | Thiel et al. | 188/73.38 X |
| 4,881,623 | 11/1989 | Kondo | 188/73.36 X |
| 4,901,825 | 2/1990 | Weiler | 188/73.35 |

FOREIGN PATENT DOCUMENTS

| | | | |
|---|---|---|---|
| 2558141 | 7/1976 | Fed. Rep. of Germany . | |
| 2505879 | 8/1976 | Fed. Rep. of Germany . | |
| 1924633 | 8/1979 | Fed. Rep. of Germany ... | 188/73.35 |
| 2417612 | 3/1982 | Fed. Rep. of Germany . | |
| 3304904 | 8/1984 | Fed. Rep. of Germany ... | 188/73.38 |
| 3532975 | 3/1987 | Fed. Rep. of Germany . | |
| 2030251 | 4/1980 | United Kingdom . | |
| 2147673 | 5/1985 | United Kingdom . | |
| 2180605 | 4/1987 | United Kingdom . | |
| 2190442 | 11/1987 | United Kingdom . | |

Primary Examiner—Douglas C. Butler
Attorney, Agent, or Firm—Robert P. Seitter; J. Gordon Lewis

[57] ABSTRACT

A resilient guide for the brake housing of a floating caliper spot-type disc brake for automotive vehicles in which the brake carrier is integrated into the steering knuckle. A resilient spring for a brake housing (1) of a floating caliper spot-type disc brake with a brake carrier integrated into the steering knuckle is provided. The spring arrangement comprises at least one spring (2, 7) secured to the brake housing (1) at predetermined points (A, B). The spring (2, 7) in its unloaded condition, is premounted on brake housing (1) and after assembly of the brake housing (1) is loaded on the manufacturing belt to preload the brake housing (1) against the brake carrier arms (6). Loading of the spring (2) is effected such that the center is moved toward the wheel axle, and is fixed to projections (4) of the brake housing (1) and is then supported, with extensions (5), to arms (6) of the brake carrier. The entire mounting operation advantageously can be performed by an industrial robot.

10 Claims, 1 Drawing Sheet

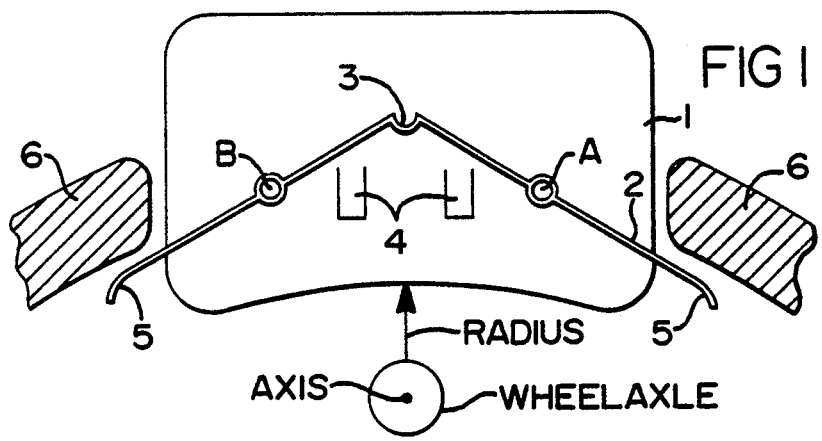
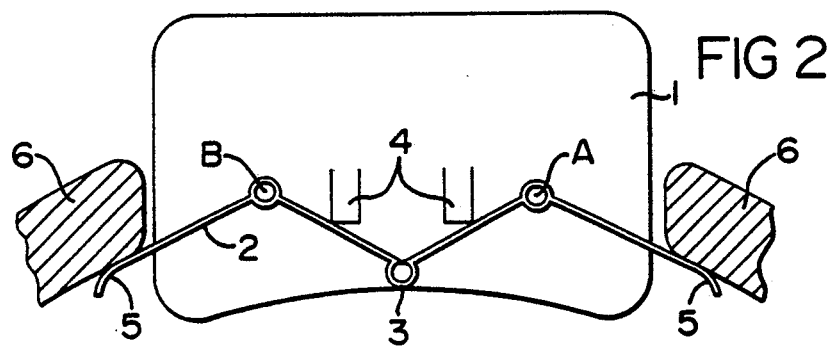
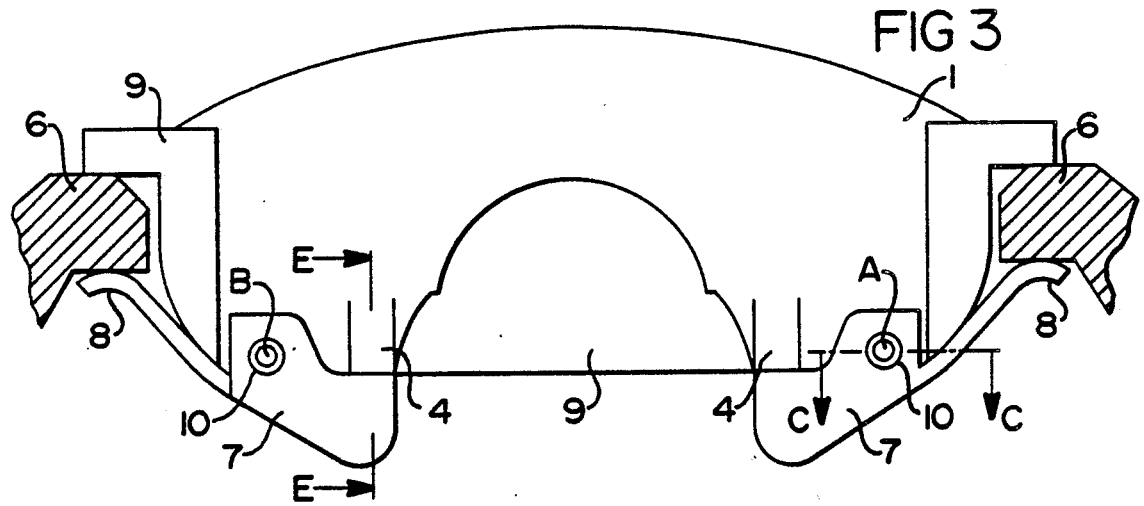
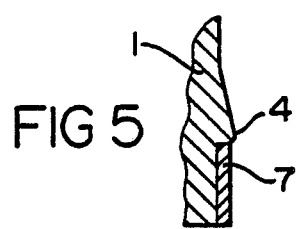
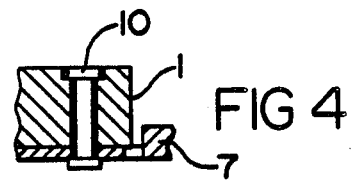

RESILIENT GUIDE FOR THE BRAKE HOUSING OF A FLOATING CALIPER SPOT-TYPE DISC BRAKE

BACKGROUND OF THE INVENTION

The present invention relates to a resilient guide for a brake housing of a floating caliper spot-type disc brake for automotive vehicles.

Housing springs for the housings of floating caliper spot-type disc brakes are known which are utilized to preclude a removal of the brake housing during deceleration as disclosed in German application DE OS 35 32 975. Known conventional solutions utilize a configuration wherein the springs are mounted under tension. This, however, renders a difficult assembly of the springs on the mounting belt particularly in cases where the brake carrier is integrated into the steering knuckles. Moreover, the brake in those cases is provided in separate parts therefore involving costs.

The problem addressed by the present invention is to provide a resilient guide for the brake housing of a floating caliper spot-type disc brake secured thereto thus being capable of being supplied in a premounted condition on the brake housing.

SUMMARY OF THE INVENTION

This problem is solved by the present invention wherein provision of a resilient guide is made for a brake housing of a floating caliper spot type disc brake for automotive vehicles. The fixation of the rotating of the spring, for example, about the points of attachment, together with the mounting and supporting of the spring provides an integration of the brake assembly into an existing automated belt of the manufacture of the automotive vehicle. In that case, the brake housing is mounted with an unloaded resilient guide on the carrier of the brake integrated, for example, into the steering knuckle. Subsequently, the spring is turned about its point or points of attachment and fixed in an end position wherein it is supported on the brake carrier to load the housing against that member. These working steps can be performed by an industrial robot as described hereinafter.

According to an advantageous embodiment of the present invention, the spring is of an integral configuration, with the spring exhibiting, centrally thereof, a joint. Then loading of the spring against the brake carrier is effected in that the central section of the spring with the joint is moved through the points of attachment toward the wheel axle. Once the spring is arranged to exhibit a joint, back-jumping into the initial position is precluded as the distance between the points of attachment is shorter than the spring length between these points. To additionally lock the spring in its end position, or for use with configurations having no central joint, it is, however, also possible to mold to the brake housing one or more projections of triangular section which serve as a ramp under which the spring is provided.

According to another embodiment of the present invention, two springs are provided on the brake housing which, after rotation about the points of attachment and fixation respectively to one projection acting as a ramp and molded to the brake housing, are then supported with the extensions thereof to the brake carrier to preload brake housing and brake carrier one against the other. The springs may be formed selectively as wire springs or from a punch element. A positive tie connection such as a rivet, also is suitable to secure the springs to the brake housing.

BRIEF DESCRIPTION OF THE DRAWING

Further embodiments and the principles of the present invention are more fully described with reference to the accompanying drawing, wherein:

FIG. 1 is an illustration of a spring of integral configuration comprising a joint, in the unloaded position;

FIG. 2 is an illustration of a spring of integral configuration comprising a joint, in loaded condition;

FIG. 3 is a plan view of a brake housing exhibiting two separate springs, which, by extensions, are supported on the brake carrier;

FIG. 4 is a section taken along the line C—C of FIG. 3; and,

FIG. 5 is a section taken along the line E—E of FIG. 3.

DETAILED DESCRIPTION

FIG. 1 shows integral spring 2 secured to brake housing 1 on points A and B, with joint 3 midway between the points of attachment (A, B). Molded to the brake housing 1 are two projections 4. The vehicle wheel axle is symbolically illustrated in the drawing in conjunction with FIG. 1, and while not to scale, it nevertheless serves to define and illustrate the circumferentially extending and radially inwardly facing directions of the various elements described herein and set forth in the appended claims. Extensions 5 of spring 2, in the circumferential direction, protrude beyond brake housing 1. Legs 6 of the brake carrier integrated into the steering knuckle are shown in the circumferential direction next to the brake housing 1. The spring as illustrated in FIG. 1 is unloaded.

FIG. 2 shows the same arrangement as FIG. 1 except that spring 2 is loaded. Joint 3, in the illustration is guided downwardly between the points of attachment A and B, and is locked on the two projections 4. Extensions 5 of spring 2 are supported on the brake carrier arms 6 to preload the brake housing 1 against the brake carrier.

An alternative two-part spring configuration is shown by FIG. 3. Two mirror-symmetrical springs are secured to points A and B, locked on projections and, with extensions 8, are supported on the brake carrier arms 6. A brake shoe 9 is provided between brake housing 1 and brake carrier arms 6.

FIG. 4 is a view along a section line C—C of FIG. 3, which illustrates an attachment capability by way of a rivet 10, rotatably connecting a spring 7 to the brake housing 1. FIG. 5 illustrates a section along line E—E of FIG. 3. A projection 4 molded to brake housing 1 is provided, which serves as a ramp and to which spring 7 is fixed.

What has been taught, then, is a resilient guide for a brake housing of a floating caliper spot-type disc brake for automotive vehicles facilitating, notably, loading, mounting and supporting of the spring member in an automated process. The form of the invention described and illustrated herein is merely one form of the invention as currently preferred for manufacture and it is pointed out that other forms and variations may be indulged in within the scope of the appended claims.

What is claimed is:

1. A method for mounting a brake housing to a brake carrier of an automotive vehicle, said brake housing circumferentially extending between brake carrier arms about a wheel axle having an axle axis, said method comprising the steps of:
   providing a circumferentially extending spring;
   providing a circumferentially spaced apart attachment points on said brake housing;
   providing projections on said brake housing between said attachment points and which project axially away from said brake housing;
   mounting said spring onto said brake housing between end portions of the carrier arms and in an unloaded spring condition;
   attaching said spring to said housing at said attachment points so that the circumferentially outer ends of said spring extend under the radially inwardly facing sides of said end portions of said carrier arms; and,
   moving the central portion of said spring radially inwardly toward said wheel axle until portions of said spring located between said attachment points engage the radially inwardly facing portions of said projections to retain said spring in a loaded condition wherein the circumferentially outer ends resiliently engage said arms.

2. The method according to claim 1 including the step of providing a ramp surface on each of said projections which tapers away from said brake housing in the radially inward direction.

3. The method according to claim 1 wherein said spring comprises first and second spring segments separated from one another in said central portion and wherein said central portion includes an end portion of the confronting ends of each spring segment.

4. A device for mounting a brake housing to a brake carrier of an automotive vehicle, said brake housing circumferentially extending between brake carrier arms about a wheel axle having an axle axis, said device comprising, in combination:
   a circumferentially extending spring;
   at least two attachment points circumferentially spaced apart on said brake housing;
   a plurality of projections on said brake housing between said attachment points and which project axially away from said brake housing;
   means for mounting said spring onto said brake housing between end portions of the carrier arms and in an unloaded spring condition;
   means for attaching said spring to said housing at said attachment points so that the circumferentially outer ends of said spring extend under the radially inwardly facing sides of said end portions of said carrier arms; and,
   wherein moving the central portion of said spring radially inwardly toward said wheel axle causes portions of said spring located between said attachment points to engage the radially inwardly facing portions of said projections to retain said spring in a loaded condition wherein the circumferentially outer ends resiliently engage said arms.

5. The device according to claim 4 including a ramp surface on each of said projections which tapers away from said brake housing in the radially inward direction.

6. The device according to claim 4 wherein said spring comprises first and second spring segments separated from one another in said central portion and wherein said central portion includes an end portion of the confronting ends of each spring segment.

7. A method for mounting a brake housing to a brake carrier of an automotive vehicle, said brake housing circumferentially extending between carrier arms about a wheel axle having an axle axis, said method comprising the steps of:
   providing a circumferentially extending spring;
   an attachment point on said brake housing circumferentially spaced apart from one of said carrier arms;
   providing a projection on said brake housing between said attachment point and said one of said carrier arms and which projects axially away from said brake housing;
   mounting said spring onto said brake housing between an end portion of said one of said carrier arms and said attachment point and in an unloaded spring condition;
   attaching said spring to said housing at said attachment point so that the circumferentially outer end of said spring extends under the radially inwardly facing side of said end portion of one of said said carrier arms; and,
   moving the central portion of said spring radially inwardly toward said wheel axle until the free end portion of said spring engages the radially inwardly facing portion of said projection to retain said spring in a loaded condition wherein the free circumferentially outer end resiliently engages said one of said carrier arms.

8. The method according to claim 7 including the step of providing a ramp surface on said projection which tapers away from said brake housing in the radially inward direction.

9. A device for mounting a brake housing to a brake carrier of an automotive vehicle, said brake housing circumferentially extending between brake carrier arms about a wheel axle having an axle axis, said device comprising in combination:
   a circumferentially extending spring;
   an attachment point on said brake housing circumferentially spaced apart from one of said carrier arms;
   a projection on said brake housing between said attachment point and said one of said carrier arms and which projects axially away from said brake housing;
   means for mounting said spring onto said brake housing between an end portion of said one of said carrier arms and said attachment point and in an unloaded spring condition;
   means for attaching said spring to said housing at said attachment point so that the circumferentially outer end of said spring extends under the radially inwardly facing side of said end portion of said one of said carrier arms; and,
   wherein moving the central portion of said spring in a radial direction with respect to said wheel axle causes the free end portion of said spring to engage a radially facing portion of said projection to retain said spring in a loaded condition wherein the free circumferentially outer end resiliently engages said one of said carrier arms.

10. The device according to claim 9 including a ramp surface on said projection which tapers away from said brake housing in said radial direction.

* * * * *